US008856478B2

(12) United States Patent
Hirano et al.

(10) Patent No.: US 8,856,478 B2
(45) Date of Patent: Oct. 7, 2014

(54) ARITHMETIC PROCESSING UNIT, INFORMATION PROCESSING DEVICE, AND CACHE MEMORY CONTROL METHOD

(75) Inventors: Takahito Hirano, Kawasaki (JP); Iwao Yamazaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 243 days.

(21) Appl. No.: 12/929,027

(22) Filed: Dec. 22, 2010

(65) Prior Publication Data

US 2011/0161600 A1 Jun. 30, 2011

(30) Foreign Application Priority Data

Dec. 25, 2009 (JP) ................................. 2009-296262

(51) Int. Cl.
G06F 12/00 (2006.01)
G06F 12/08 (2006.01)
G06F 9/30 (2006.01)
G06F 9/38 (2006.01)

(52) U.S. Cl.
CPC ........ *G06F 12/0804* (2013.01); *G06F 9/30043* (2013.01); *G06F 9/3824* (2013.01); *G06F 9/30047* (2013.01); *G06F 12/0859* (2013.01)
USPC ............ 711/166; 711/152; 711/170; 711/144

(58) Field of Classification Search
USPC ........................ 711/133, 144, 152, 166, 170
See application file for complete search history.

(56) References Cited

U.S. PATENT DOCUMENTS

| 4,992,977 | A | 2/1991 | Matoba et al. |
| 5,455,924 | A | 10/1995 | Shenoy et al. |
| 5,897,654 | A | 4/1999 | Eisen et al. |
| 6,000,015 | A * | 12/1999 | Whittaker ...................... 711/134 |
| 6,360,298 | B1 | 3/2002 | Osanai et al. |
| 6,374,330 | B1 | 4/2002 | Arimilli et al. |
| 6,823,406 | B2 | 11/2004 | Yoda et al. |
| 2002/0188810 | A1 | 12/2002 | Nakamura |
| 2004/0064649 | A1 * | 4/2004 | Volpe et al. ................... 711/137 |
| 2009/0172296 | A1 | 7/2009 | Tsuji et al. |
| 2011/0131381 | A1 * | 6/2011 | Kaplan ......................... 711/141 |

FOREIGN PATENT DOCUMENTS

| EP | 0 892 660 | 3/2000 |
| JP | 5-143451 | 6/1993 |
| JP | 10-301849 | 11/1998 |
| JP | 2000-076205 | 3/2000 |
| JP | 2003-029967 | 1/2003 |
| JP | 2009-157612 | 7/2009 |

OTHER PUBLICATIONS

Extended European Search Report dated Jan. 16, 2012 issued in corresponding European Patent Application No. 10196545.7.
Japanese Office Action mailed Nov. 5, 2013 for Japanese Application No. 2009-296262.

* cited by examiner

*Primary Examiner* — Kalpit Parikh
(74) *Attorney, Agent, or Firm* — Staas & Halsey LLP

(57) ABSTRACT

A processor holds, in a plurality of respective cache lines, part of data held in a main memory unit. The processor also holds, in the plurality of respective cache lines, a tag address used to search for the data held in the cache lines and a flag indicating the validity of the data held in the cache lines. The processor executes a cache line fill instruction on a cache line corresponding to a specified address. Upon execution of the cache line fill instruction, the processor registers predetermined data in the cache line of the cache memory unit which has a tag address corresponding to the specified address and validates a flag in the cache line having the tag address corresponding to the specified address.

6 Claims, 12 Drawing Sheets

ARITHMETIC PROCESSING UNIT,
INFORMATION PROCESSING DEVICE, AND
CACHE MEMORY CONTROL METHOD

CROSS-REFERENCE TO RELATED
APPLICATION

This application is based upon and claims the benefit of priority of the prior Japanese Patent Application No. 2009-296262, filed on Dec. 25, 2009, the entire contents of which are incorporated herein by reference.

FIELD

The embodiments discussed herein are directed to an arithmetic processing unit, an information processing device, and a cache memory control method.

BACKGROUND

Conventionally, a store-through method, also referred to as a write-through method, or a store-in method, also referred to as a write-back method, is used as a method of controlling the cache memory of a processor used as an arithmetic processing unit installed in a server used as an information processing device. These methods will be described using an exemplary structure including a main memory unit connected to a processor and a two-level cache memory including a secondary cache memory and a primary cache memory that are integrated in the processor.

When the store-through method is used in the processor, each time data is written in the secondary cache memory in the processor, the data is also written in the main memory unit. This causes access to the main memory unit, which has a slower access time than the secondary cache memory, to occur frequently. Therefore, in the processor that uses the store-through method, the writing to the secondary cache memory, which is faster than the main memory unit, may always wait for completion of the writing to the main memory unit, and this slows down the writing to the secondary cache memory.

When the store-in method is used in the processor, data is written only in the primary or secondary cache memory when a store instruction is executed and is not written in the main memory unit. Therefore, with the store-in method, when data is stored in a cache line in the secondary cache memory in which other data is present, the data registered in the cache line may be evacuated. At this timing, the processor writes the data held in the cache line into the main memory unit. In this process, the processor writes the data registered in the cache line into the main memory unit to invalidate the cache line and then registers a new cache line in the invalidated cache line. In this manner, the processor that uses the store-in method can write data written in a cache line into the main memory unit. In addition, the processor can complete writing to the secondary cache memory without waiting for the completion of writing to the main memory unit.

However, in the store-in method, "when the main memory unit is initialized" or "when data in one address in the main memory unit is copied to another address therein," a process of writing data in a continuous area in the main memory unit is performed. An example of "copying data from one address in the main memory unit to another address therein" is illustrated in FIG. 12. FIG. 12 is a diagram illustrating the example of copying data from one address in the main memory unit to another address therein. As illustrated in FIG. 12, "to copy data from one address in the main memory unit 200 to another address therein" is, for example, to copy data A from address 0x1000 in the main memory to other addresses 0x1080, 0x1100, and 0x1180. More specifically, one example of copying data from one address in the main memory unit 200 to another address therein is, for example, to copy data in one area in main memory unit 200 to another area.

In these cases, the number of references to the main memory unit slower than the cache memories, i.e., the number of accesses to the main memory unit is lower in the store-through method than in the store-in method, and therefore high-speed processing may be achieved with the store-through method.

In the description below, the data unit used when the main memory unit is accessed is assumed to be, for example, 64 bytes. In a processor that uses the store-through method, "when the main memory unit is initialized," 64-byte initialization data is directly written to the main memory unit to be initialized, and therefore the main memory unit is accessed one time. "When data stored in one address in the main memory unit is copied to another address therein," the processor accesses the main memory unit to fetch 64-byte data therefrom and accesses the main memory unit to write the 64-byte data thereto. Therefore, the processor accesses the main memory unit two times.

In a processor that uses the store-in method, store data is written only to the cache memory. Therefore, before the data is written to the cache memory, the address of the main storage area to which the data is to be written may be registered in the cache memory in advance. Therefore, when "the main memory unit is initialized," the processor that uses the store-in method accesses the main memory unit two times. More specifically, the processor that uses the store-in method accesses the main memory unit to fetch 64-byte data from the main storage area to be initialized since the address thereof may be registered in the cache memory in advance. In addition, the processor accesses the main memory unit to write the 64-byte data written in the cache memory to the main memory unit.

When "data stored in one address in the main memory unit is copied to another address therein," the processor that uses the store-in method accesses the main memory unit three times. More specifically, the processor that uses the store-in method accesses the main memory unit to fetch 64-byte source data therefrom and also accesses the main memory unit to fetch 64-byte data from a target area that may be registered in the cache memory in advance. In addition, the processor accesses the main memory unit to write the 64-byte source data written in the cache memory to the main memory unit.

Referring to FIG. 13, a description is given of an example of "copying data stored in one address in the main memory unit to another address therein" using the store-in method. FIG. 13 is a diagram illustrating an example of copying data stored in one address in a conventional main memory unit to another address therein. In FIG. 13, the example of copying data A stored in address 0x1000 in the main memory unit 200 to address 0x1080 is described.

As illustrated in FIG. 13, the processor 300 first loads the data A from source address 0x1000 and registers the data A in address 0x1000 in a primary cache memory 310 and in address 0x1000 in a secondary cache memory 320. Next, the processor 300 executes a store instruction to write the data to target address 0x1080. More specifically, the processor 300 loads data B from address 0x1080 in the main memory unit 200 and registers data B in address 0x1080 in the primary cache memory 310 and in address 0x1080 in the secondary cache memory 320. Then the processor 300 registers data A in address 0x1080 in the primary cache memory 310 and in address 0x1080 in the secondary cache memory 320. Next, the processor 300 executes a store-in operation (write-back operation) to register data A registered in address 0x1080 in the secondary cache memory 320 in address 0x1080 in the main memory unit 200. As described above, with the store-in method, the main memory unit 200 may be accessed three times when data is copied within the main memory unit 200.

As described above, in the processor that uses the store-in method, the number of accesses to the main memory unit when the main memory unit is initialized is twice that in the store-through method, and the number of accesses to the main memory unit when data is copied is 1.5 times that in the store-through method. In addition, when a predetermined amount of data is processed, the time taken for data processing increases in proportion to the number of accesses to the main memory. Therefore, it is important to complete the data processing in a short time. More specifically, to achieve high-speed data processing, it is important to reduce the number of accesses to the main memory.

In recent years, a block store instruction, which is an instruction for writing a store block (for example, a 64-byte data block) directly into a main memory unit in one instruction, is used as a technique for reducing the number of accesses to the main memory unit in a processor using the store-in method. For example, a processor that uses the store-in method uses the block store instruction when "the main memory unit is initialized" or when "data stored in one address in the main memory unit is copied to another address therein." When the block store instruction is executed, the processor that uses the store-in method writes data to a cache memory if the target writing area in the main memory unit has been registered in the cache memory. However, when the block store instruction is executed, the processor that uses the store-in method writes the data directly to the cache memory when the target writing area in the main memory unit is not registered in the cache memory.

The use of the block store instruction can omit one access to the main memory unit (i.e., data reading from the main memory unit to register, in the cache memory, the target writing area in the main storage area) that is executed when the store-in method is used.

Patent Document 1: Japanese Laid-open Patent Publication No. 2000-76205

Patent Document 2: Japanese Laid-open Patent Publication No. 10-301849

Patent Document 3: Japanese Laid-open Patent Publication No. 2003-29967

However, the conventional technique has a problem in that initialization of the main memory unit or copying of data form one address in the main memory unit to another address therein may not be performed at high speed in some cases even when the block store instruction is used. More specifically, in a processor that uses the store-in method, execution of the block store instruction allows high-speed processing when the data width of a cache line matches the data width of the accessed main memory unit. However, in the processor that uses the store-in method, a high-speed operation may not be achieved when the data width of the cache line is, for example, 128 bytes and the data width of the main memory is, for example, 64 byte.

For example, assuming that, in a processor including a plurality of processor cores and a plurality of primary cache memories connected to one secondary cache memory, a target cache line for the block store instruction is registered in one of the primary cache memories. Then when the data width of the cache line matches the data width of the store block, the processor instructs the primary cache memory to invalidate the cache line. Next, the processor overwrites the data in the secondary cache memory with the block store data, and the block store instruction is thereby completed.

However, when the data width of the target cache line for the block store instruction is greater than the data width of the store block, some area in the cache line may not be overwritten with the block store data. In such a case, the processor loads the data in the primary cache memory, stores this data in the secondary cache memory, and then stores the block store data in the secondary cache memory. Then the processor may for example, store, in the primary cache memory, the data in the secondary cache memory in which the block store data has been stored.

As described above, the processor that executes the block store instruction may execute a process other than the process for the normal block store instruction when the size of the cache line is greater than the size of the store block (for example, is 128 bytes). This results in difficulty in the design of, for example, the secondary cache memory and may also result in performance deterioration.

SUMMARY

According to an aspect of an embodiment of the invention, an arithmetic processing unit connected to a main memory unit includes a cache memory unit having a plurality of cache lines in which part of data held in the main memory unit is held, a tag memory unit that holds, in the plurality of cache lines, a tag address used to search for the data held in the plurality of cache lines and a flag indicating validity of the data held in the plurality of cache lines, an instruction execution unit that executes a cache line fill instruction on a cache line corresponding to a specified address, and a cache memory control unit that, when the instruction execution unit executes the cache line fill instruction, registers predetermined data in a cache line of the cache memory unit which cache line has a tag address corresponding to the specified address and validates a flag in the cache line having the tag address corresponding to the specified address.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENTS

Preferred embodiments of the present invention will be explained with reference to accompanying drawings. However, the present invention is not limited to the embodiments.

Structure of Processor

Figure 1:
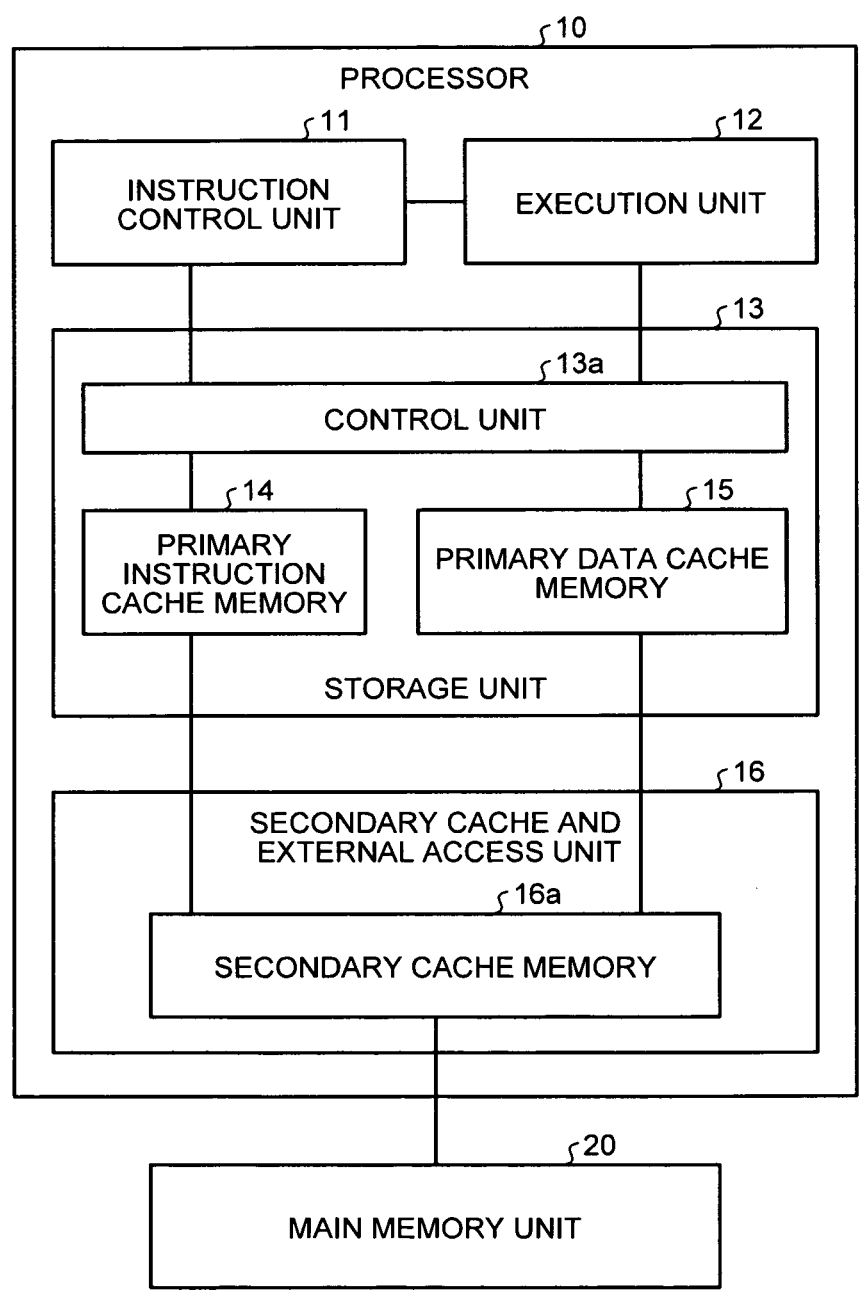
FIG. 1 is a block diagram illustrating the structure of a processor according to a first embodiment.

FIG. 1 is a block diagram illustrating the structure of a processor according to a first embodiment. As illustrated in FIG. 1, a processor 10 includes an instruction control unit (IU) 11 and an execution unit (EU) 12. The processor 10 further includes a storage unit (SU) 13 and a secondary cache and external access unit (SX) 16. The processor 10 further includes an instruction pipeline and is connected to a main memory unit 20. The main memory unit 20 is a RAM (Random Access Memory) in which a larger amount of data can be registered as compared to cash memories, and is a storage unit for storing instructions and data.

The processor 10 is an arithmetic processing unit such as a CPU (Central Processing Unit), an MPU (Micro Processing Unit), or a DSP (Digital Signal Processor) and controls a primary cache memory and a secondary cache memory described later using the store-in method. The structure of the processor illustrated is for the purpose of illustration only, and this is not a limitation.

The instruction control unit 11 issues instructions in an instruction sequence predefined by a compiler (program). For example, the instruction control unit 11 issues store and load instructions to the storage unit 13. In addition, the instruction control unit 11 issues an XFILL instruction to the storage unit 13. The XFILL instruction is an instruction for preprocessing executed before the execution of the store instruction used when a predetermined area in the main memory unit 20 is initialized or used when data stored in a predetermined area in the main memory unit 20 is copied to another area therein. Therefore, when the store instruction is outputted, the instruction control unit 11 outputs the XFILL instruction for the target address of the store instruction to perform preprocessing for the store instruction.

In the processing of the XFILL instruction, a determination is made as to whether or not data to be stored in a target initialization area in the main memory unit or in a copy destination area in the main memory unit has been stored in a secondary cache memory 16a controlled by the store-in method. Next, in the processing of the XFILL instruction, if a determination is made that the data is not stored in the secondary cache memory 16a, the predetermined data is registered in a cache line corresponding to the initialization target area or the copy destination area in the main memory unit 20, and a flag in a tag memory in the cache line is validated.

Since the instruction control unit 11 sequentially issues instructions, the store instruction subsequent to the XFILL instruction is issued to the storage unit 13 after the XFILL instruction is issued to the storage unit 13. However, the execution of instructions is controlled by the storage unit 13 described later. The store data used in the store instruction subsequent to the XFILL instruction is, for example, initialization data used to initialize a predetermined area in the main memory unit 20 before execution of a program such as an OS or firmware executed upon startup or source data to be copied within the main memory unit.

The execution unit 12 executes various operations such as arithmetic operations, logical operations, and address computations and stores the operation results in a primary data cache memory 15 in the storage unit 13. The storage unit 13 stores instructions outputted from the instruction control unit 11 and the operation results obtained in the execution unit 12 and includes a control unit 13a, a primary instruction cache memory 14, and the primary data cache memory 15.

Figure 2:
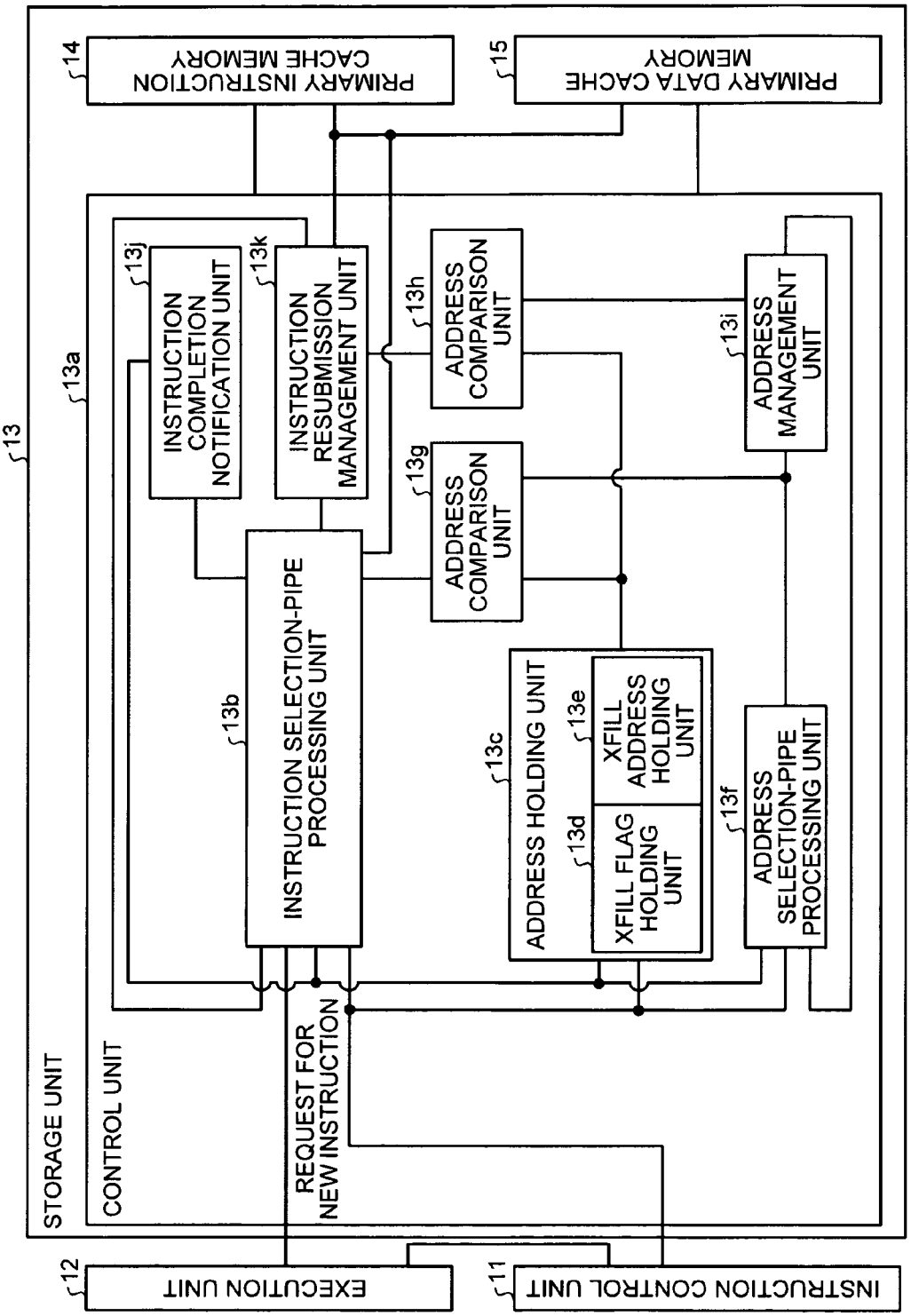
FIG. 2 is a diagram illustrating the detail of a storage unit according to the first embodiment.

The control unit 13a outputs the XFILL instruction received from the instruction control unit 11 to the secondary cache and external access unit 16 to request, for example, execution of the instruction. As illustrated in FIG. 2, the control unit 13a includes an instruction selection-pipe processing unit 13b, an address holding unit 13c, an address selection-pipe processing unit 13f, and an address comparison unit 13g. The control unit 13a further includes an address comparison unit 13h, an address management unit 13i, an instruction completion notification unit 13j, and an instruction resubmission management unit 13k. In the control unit 13a, these control units inhibit execution of the instruction subsequent to the XFILL instruction. FIG. 2 is a diagram illustrating the detail of the storage unit according to the first embodiment.

The instruction selection-pipe processing unit 13b selects, from instructions in the primary instruction cache memory 14, an instruction corresponding to a new instruction outputted from the instruction control unit 11 and then submits the selected instruction to the instruction pipeline. For example, the instruction selection-pipe processing unit 13b selects, from the instructions in the primary instruction cache memory 14, a store or load instruction outputted from the instruction control unit 11 and then submits the selected instruction to the instruction pipeline to execute the instruction. When the XFILL instruction is outputted from the instruction control unit 11, the instruction selection-pipe processing unit 13b submits the XFILL instruction to the instruction pipeline to execute the instruction.

When an instruction is submitted to the instruction pipeline, the instruction selection-pipe processing unit 13b submits the instruction to the instruction pipeline to execute the instruction if the comparison result from the address comparison unit 13g described later is true. For example, when the store instruction is submitted after submission of the XFILL instruction, the instruction selection-pipe processing unit 13b inhibits (holds) the execution of the store instruction while the comparison result from the address comparison unit 13g is false and submits the store instruction to the instruction resubmission management unit 13k. More specifically, the instruction selection-pipe processing unit 13b submits the store instruction submitted subsequent to the XFILL instruction after completion of the XFILL instruction.

The address holding unit 13c includes an XFILL flag holding unit 13d and an XFILL address holding unit 13e. For example, when the XFILL instruction is outputted from the instruction control unit 11 and executed by the secondary cache and external access unit 16, the XFILL flag holding unit 13d holds "1" indicating that, for example, the XFILL flag is valid (ON). When the XFILL instruction is not executed, the XFILL flag holding unit 13d holds "0" indicating that, for example, the XFILL flag is invalid (OFF). The XFILL address holding unit 13e holds the specified address of the cache line fill instruction until completion of registration of predetermined data in a cache line at a tag address corresponding to the specified address and completion of validation of a flag corresponding to the cache line at the tag address corresponding to the specified address. More specifically, when the XFILL instruction is outputted from the instruction control unit 11, the XFILL address holding unit 13e holds the target address of the XFILL instruction.

Upon receiving a notification of the completion of the XFILL instruction from the instruction completion notification unit 13j described later, the address holding unit 13c releases the target address of the XFILL instruction that has been held in the XFILL address holding unit 13e. After the address holding unit 13c releases the target address of the XFILL instruction, the address holding unit 13c invalidates the XFILL flag held in the XFILL flag holding unit 13d.

The address selection-pipe processing unit 13f submits the target address of an instruction outputted from the instruction control unit 11 to the instruction pipeline. For example, the address selection-pipe processing unit 13f outputs the target address of the instruction to the address comparison unit 13g and the address management unit 13i. Upon receiving a submission instruction from the address management unit 13i, the address selection-pipe processing unit 13f submits the address to the instruction pipeline. Upon receiving an inhibition instruction from the address management unit 13i, the address selection-pipe processing unit 13f inhibits the submission of the address to the instruction pipeline.

The address comparison unit 13g compares the target address of the XFILL instruction that is held in the XFILL address holding unit 13e of the address holding unit 13c with the target address that is to be submitted to the instruction pipeline by the address selection-pipe processing unit 13f. If the compared addresses match, the address comparison unit 13g outputs, to the instruction selection-pipe processing unit 13b, an instruction to inhibit the execution of the instruction corresponding to the target address that is to be submitted to the instruction pipeline by the address selection-pipe processing unit 13f. Similarly, the address comparison unit 13g outputs, to the address management unit 13i, an instruction to inhibit the submission of the target address that is to be submitted to the instruction pipeline by the address selection-pipe processing unit 13f. More specifically, the address comparison unit 13g inhibits the execution of the load or store instruction corresponding to the target address of the XFILL instruction.

If the compared addresses do not match, the address comparison unit 13g outputs, to the instruction selection-pipe processing unit 13b, an instruction to execute the instruction corresponding to the target address to be submitted to the instruction pipeline by the address selection-pipe processing unit 13f. Similarly, the address comparison unit 13g outputs, to the address management unit 13i, an instruction to submit the target address to be submitted to the instruction pipeline by the address selection-pipe processing unit 13f.

The address comparison unit 13h compares the target address of the XFILL instruction that is held in the XFILL address holding unit 13e of the address holding unit 13c with the address managed and inhibited by the address management unit 13i to determine whether or not these addresses match each other. If the compared addresses match, the address comparison unit 13h outputs, to the instruction resubmission management unit 13k, an instruction to maintain the inhibited state of the instruction corresponding to the address inhibited from submission. Similarly, the address comparison unit 13h outputs, to the address management unit 13i, an instruction to maintain the inhibition of the submission of the address inhibited from submission.

More specifically, the address comparison unit 13h maintains the inhibition of the execution of the load or store instruction corresponding to the target address of the XFILL instruction.

If the compared addresses do not match, the address comparison unit 13h outputs, to the instruction resubmission management unit 13k, an instruction to submit, to the instruction pipeline, the instruction corresponding to the address managed and inhibited by the address management unit 13i. Similarly, the address comparison unit 13h outputs to the address management unit 13i an instruction to submit the address inhibited from submission.

The address management unit 13i manages the address outputted from the address selection-pipe processing unit 13f. For example, upon receiving an address submission instruction from the address comparison unit 13g, the address management unit 13i outputs the address submission instruction to the address selection-pipe processing unit 13f. Upon receiving an address submission inhibition instruction from the address comparison unit 13g, the address management unit 13i outputs the address submission inhibition instruction to the address selection-pipe processing unit 13f.

Upon receiving an address submission instruction from the address comparison unit 13h, the address management unit 13i outputs an instruction to submit the address inhibited from submission to the address selection-pipe processing unit 13f. Upon receiving an instruction to maintain the inhibited state of the address inhibited from submission from the address comparison unit 13h, the address management unit 13i outputs an instruction to inhibit the submission of the address inhibited from submission to the address selection-pipe processing unit 13f.

The instruction completion notification unit 13j monitors whether or not the execution of the instruction submitted from the instruction selection-pipe processing unit 13b or the instruction resubmission management unit 13k to the instruction pipeline is completed. When the execution of the instruction is completed, the instruction completion notification unit 13j outputs an instruction completion notification to the instruction selection-pipe processing unit 13b, the address holding unit 13c, and other units.

If a determination is made in the address comparison unit 13h that the compared addresses match, the instruction resubmission management unit 13k submits, to the instruction pipeline, the instruction inhibited from execution on the basis of the comparison result from the address comparison unit 13g.

Returning to FIG. 1, the primary instruction cache memory 14 is a high-speed accessible cache memory and stores instructions that are used relatively frequently. The primary data cache memory 15 is a high-speed accessible cache memory faster than the secondary cache memory 16a and stores high-locality data. Each of the primary instruction cache memory 14 and the primary data cache memory 15 includes tag memory sections 16b and data sections 16c, as in the secondary cache memory 16a described later (see FIG. 3), although these cache memories are different in capacity. The structures of the primary instruction cache memory 14 and the primary data cache memory 15 as well as the structure of the secondary cache memory 16a described later (see FIG. 3) are not limited to the structure described in the present embodiment.

The secondary cache and external access unit 16 includes the secondary cache memory 16a and performs various controls between "The secondary cache and external access unit 16" and "the storage unit 13". The secondary cache and external access unit 16 includes the secondary cache memory 16a and performs various controls between "The secondary cache and external access unit 16" and "the main memory unit 20". The secondary cache memory 16a stores instructions and part of the data held in the main memory unit 20 as instructions and data referenced by the processor 10.

Figure 3:
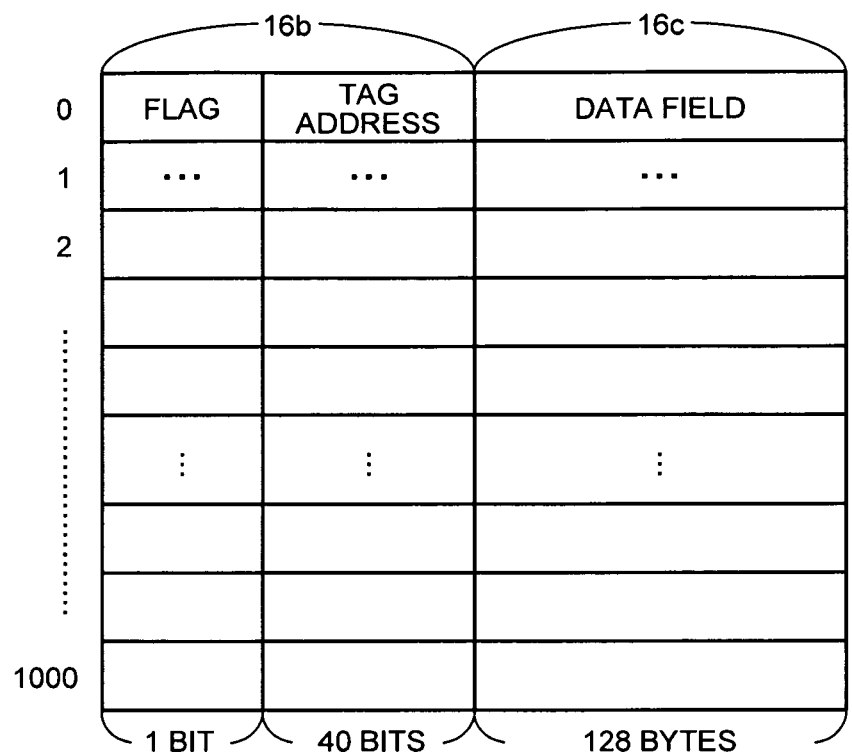
FIG. 3 is a diagram illustrating the structure of a secondary cache memory.

For example, the secondary cache memory 16a has a capacity of 1 to 4 Mbytes and includes tag memory sections 16b and data sections 16c as illustrated in FIG. 3. For example, each tag memory section 16b includes a 40-bit tag address used to retrieve data held in a cache line and a 1-bit flag (valid bit) indicating the validity of the data held in the cache line. Each data section 16c includes a data field that holds 128-byte data that is processed as an execution object of an instruction to be executed by the secondary cache and external access unit 16 if the corresponding flag is valid and the specified target address of the instruction matches the tag address of the corresponding tag memory section 16b. FIG. 3 is a diagram illustrating the structure of the secondary cache memory. The structure of the secondary cache memory is not limited to that illustrated in FIG. 3. In other words, the number of bytes, the number of bits, the number of ways, and the like are for the purpose of illustration only, and these are not limitations.

When the instruction selection-pipe processing unit 13b of the storage unit 13 executes a secondary cache memory fill instruction, the secondary cache and external access unit 16 registers predetermined data in the secondary cache memory 16a, i.e., in a data field in a cache line having a tag address corresponding to the specified address of the secondary cache memory fill instruction. Then the secondary cache and external access unit 16 validates the flag in the cache line having the tag address corresponding to the specified address.

For example, upon receiving the XFILL instruction from the instruction selection-pipe processing unit 13b of the storage unit 13, the secondary cache and external access unit 16 executes the processing for the XFILL instruction. For example, the secondary cache and external access unit 16 determines whether or not data corresponding to the target address of the XFILL instruction has been registered in the secondary cache memory 16a. Then if a determination is made that the data is not registered in the secondary cache memory 16a, the secondary cache and external access unit 16 registers, as initialization data, all zeros in a data section 16c corresponding to an initialization target or copy destination area in the main memory unit 20. Then the secondary cache and external access unit 16 validates the flag (valid bit) of the tag memory section 16b in the cache line. Next, the secondary cache and external access unit 16 informs the storage unit 13 of the execution of the XFILL instruction. If a determination is made that the data has been registered in the secondary cache memory 16a, the secondary cache and external access unit 16 does not execute any processing and informs the storage unit 13 of the execution of the XFILL instruction.

As a specific example, the secondary cache and external access unit 16 determines whether or not data B corresponding to target address 0x1050 of the XFILL instruction has been registered in a cache line having address 0x1050 in the secondary cache memory 16a. More specifically, the secondary cache and external access unit 16 determines whether or not address 0x1050 has been cached. Only if there is no cache hit, the secondary cache and external access unit 16 registers all zero initialization data in a data section 16c corresponding to address 0x1050 and validates the flag of the tag memory section 16b in the cache line.

The secondary cache and external access unit 16 writes back data from the secondary cache memory 16a to the main memory unit 20. For example, the secondary cache and external access unit 16 always monitors the secondary cache memory 16a and the main memory unit 20. When a situation occurs that the data registered in the secondary cache memory 16a is not registered in the main memory unit 20, the secondary cache and external access unit 16 executes write-back processing to load the data from the secondary cache memory 16a and register the data in the main memory unit 20. For example, assuming that data X registered in a data section 16c having address 0x1000 in the secondary cache memory 16a is not registered in address 0x1000 in the main memory unit 20. Then the secondary cache and external access unit 16 loads data X from the data section 16c in the secondary cache memory 16a and registers data X in address 0x1000 in the main memory unit.

Processing of Processor

Next, referring to FIGS. 4 to 7, a description will be given of the processing flow of the processor according to the first embodiment. First, the general processing flow will be described with reference to FIG. 4, and the processing flow of the XFILL instruction will be described with reference to FIG. 5. Then the flow of the processing of determining whether or not the store instruction is executed after the XFILL instruction will be described with reference to FIG. 6, and the processing flow of the store instruction will be described with reference to FIG. 7.

General Processing Flow

Figure 4:
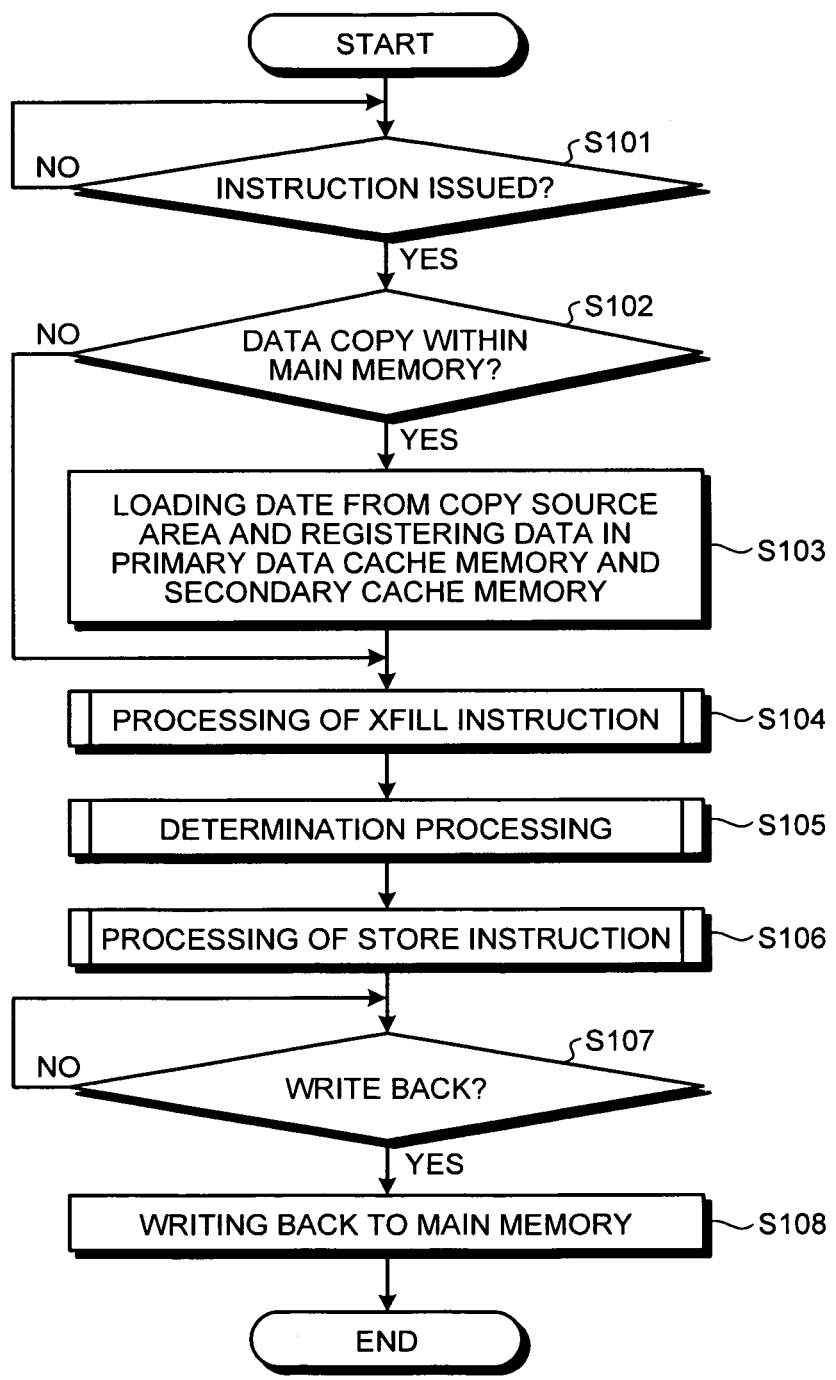
FIG. 4 is a flowchart illustrating a processing flow in the processor according to the first embodiment.

The general processing flow will be described with reference to FIG. 4. FIG. 4 is a flowchart illustrating the processing flow in the processor according to the first embodiment. The flowchart describes the processing flow when the instruction control unit 11 executes the XFILL instruction according to a compiler (program). More specifically, the flowchart describes an example in which an instruction to copy data in one address in the main memory unit 20 to another address therein or an instruction to initialize the main memory unit 20 is executed.

As illustrated in FIG. 4, if the instruction control unit 11 issues an instruction (yes in step S101), a determination is made as to whether or not the issued instruction is the instruction to copy data in one address in the main memory unit 20 to another address therein (step S102). Since the instruction control unit 11 issues instructions sequentially, the store instruction subsequent to the XFILL instruction is issued to the storage unit 13 after the XFILL instruction is issued to the storage unit 13.

If the instruction issued from the instruction control unit 11 is the instruction to copy data stored in one address in the main memory unit 20 to another address therein (yes in step S102), the secondary cache and external access unit 16 loads the data (step S103). More specifically, the secondary cache and external access unit 16 loads the data from a source area in the main memory unit 20 and registers the loaded data in the secondary cache memory 16a. Then the storage unit 13 loads the source data registered in the secondary cache memory 16a and registers the loaded data in the primary data cache memory 15.

Then the instruction control unit 11 issues the XFILL instruction, and the secondary cache and external access unit 16 executes the processing of the XFILL instruction (step S104). After completion of the XFILL instruction, the storage unit 13 executes determination processing for determining whether or not the store instruction subsequent to the XFILL instruction issued by the instruction control unit 11 is executed (step S105). Therefore, the execution of the store instruction subsequent to the XFILL instruction is inhibited until the XFILL instruction is completed. The store data used in the store instruction subsequent to the XFILL instruction is initialization data used to initialize a predetermined area in the main memory unit 20 before the execution of a program or software or is source data to be copied within the main memory unit.

Next, the storage unit 13 executes the processing of the store instruction subsequent to the XFILL instruction issued by the instruction control unit 11 (step S106). Then if a need to write back data to the main memory unit 20 arises (yes in step S107), the secondary cache and external access unit 16 writes back the data to the main memory unit 20 (step S108).

If the issued instruction is not the instruction to copy data stored in one address in the main memory unit 20 to another address therein (no in step S102), the secondary cache and external access unit 16 executes step S104 without executing step S103. More specifically, if a determination is made that the issued instruction is the instruction to initialize the main memory unit 20, the secondary cache and external access unit 16 executes the XFILL instruction without loading data from the main memory unit 20.

Processing Flow of XFILL Instruction

Figure 5:
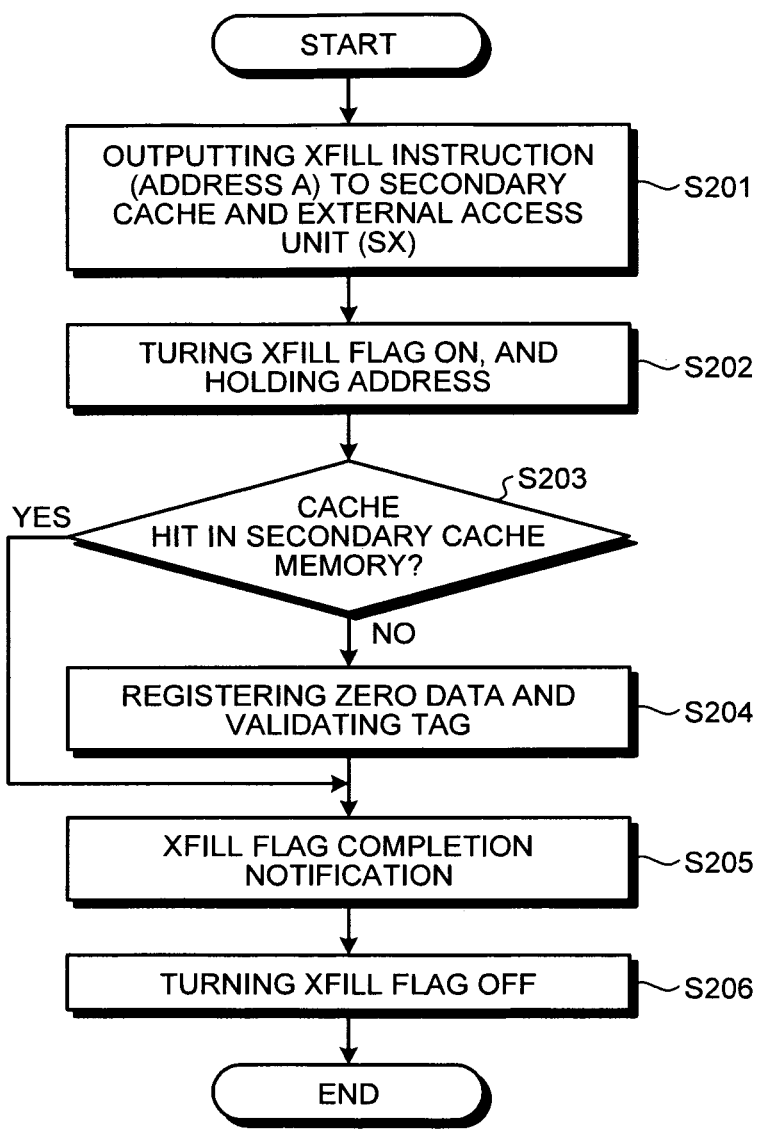
FIG. 5 is a flowchart illustrating the processing flow of an XFILL instruction.

Referring to FIG. 5, a description will be given of the processing flow of the XFILL instruction in step S104 illustrated in FIG. 4. FIG. 5 is a flowchart illustrating the processing flow of the XFILL instruction.

As illustrated in FIG. 5, the storage unit 13 outputs the XFILL instruction issued by the instruction control unit 11 to the secondary cache and external access unit 16 (step S201). In this case, the instruction control unit 11 issues the target address of the store instruction described later as the target address of the XFILL instruction.

During execution of the XFILL instruction, the storage unit 13 validates the XFILL flag held in the XFILL flag holding unit 13d and holds the target address in the XFILL address holding unit 13e of the address holding unit 13c (step S202).

Then upon receiving the XFILL instruction, the secondary cache and external access unit 16 determines whether or not the target address has been cached, i.e., the target address has been registered in the secondary cache memory 16a (step S203).

If the target address has not been cached (no in step S203), the secondary cache and external access unit 16 registers zero data in the data section 16c in a cache line having the target address and validates the flag of the tag memory section 16b in the cache line in which the zero data has been registered (step S204). Then the storage unit 13 outputs an XFILL completion notification indicating the completion of the XFILL instruction to each of the units such as the instruction completion notification unit 13j in the storage unit 13 (step S205). Then the storage unit 13 invalidates the XFILL flag held in the XFILL flag holding unit 13d of the address holding unit 13c (step S206).

If the target address has been cached in the secondary cache memory 16a (yes in step S203), the secondary cache and external access unit 16 executes step S205 without executing step S204.

Figure 6:
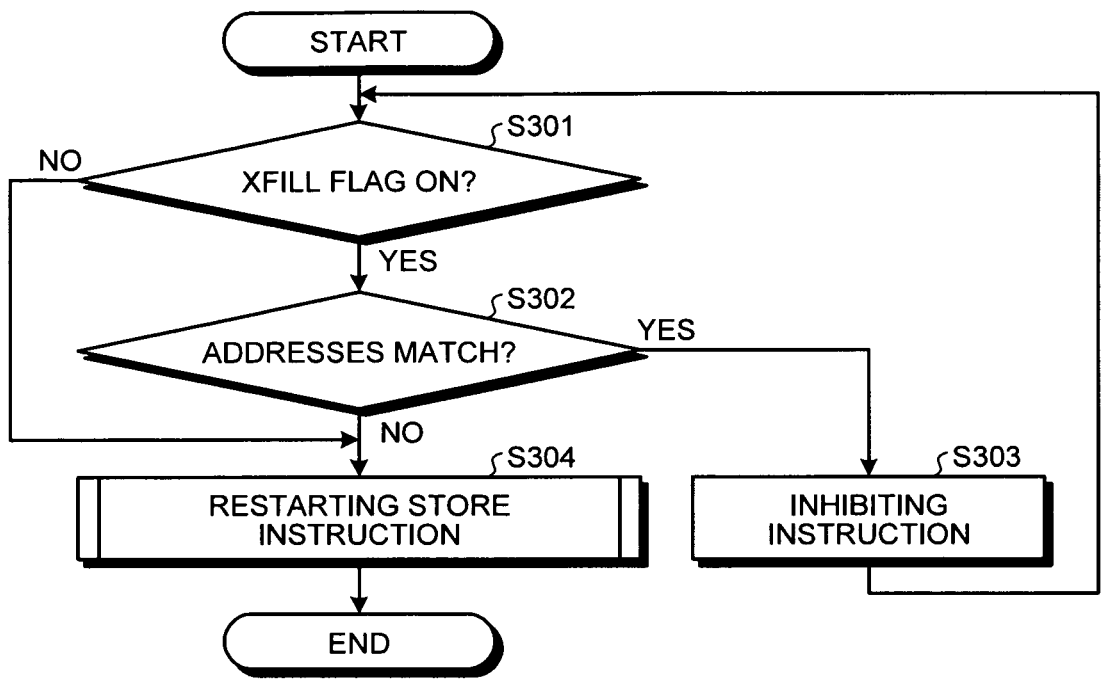
FIG. 6 is a flowchart illustrating the flow of a determination process after the XFILL instruction.

Flow of Determination Processing for Determining Whether or not Store Instruction is Executed after XFILL Instruction Referring to FIG. 6, the flow of the determination processing in step S105 illustrated in FIG. 4 will be described. FIG. 6 is a flowchart illustrating the flow of the determination processing after the XFILL instruction.

As illustrated in FIG. 6, when the store instruction subsequent to the XFILL instruction is executed-submitted, the storage unit 13 determines whether or not the XFILL flag held in the XFILL flag holding unit 13d of the address holding unit 13c is valid (step S301). If the XFILL flag is valid (yes in step S301), the storage unit 13 performs address matching (step S302).

More specifically, the storage unit 13 determines whether or not the address held in the XFILL address holding unit 13e of the address holding unit 13c matches the target address of the store instruction subsequent to the XFILL instruction.

If the XFILL flag is valid and the address matching indicates that the addresses match (yes in step S302), the storage unit 13 inhibits the execution of the store instruction received from the instruction control unit 11 after reception of the XFILL instruction (step S303). More specifically, if the address held in the XFILL address holding unit 13e of the address holding unit 13c matches the target address of the store instruction subsequent to the XFILL instruction, the execution of the subsequent store instruction is inhibited.

If the XFILL flag is invalid and therefore the subsequent store instruction having the matched address is allowed to execute (no in step S301), the storage unit 13 executes processing for resuming the store instruction inhibited from execution until the XFILL instruction is completed (step S304).

If the XFILL flag is valid and the address matching indicates that the addresses do not match (no in step S302), the storage unit 13 executes the processing for resuming the store instruction inhibited from execution until the XFILL instruction is completed (step S304). For example, if the address held in the XFILL address holding unit 13e of the address holding unit 13c does not match the target address of the store instruction subsequent to the XFILL instruction, the storage unit 13 determines that the address matching result is false. Similarly, if the address is not held in the XFILL address holding unit 13e of the address holding unit 13c, the storage unit 13 also determines that the address matching result is false.

Processing Flow of Store Instruction

Figure 7:
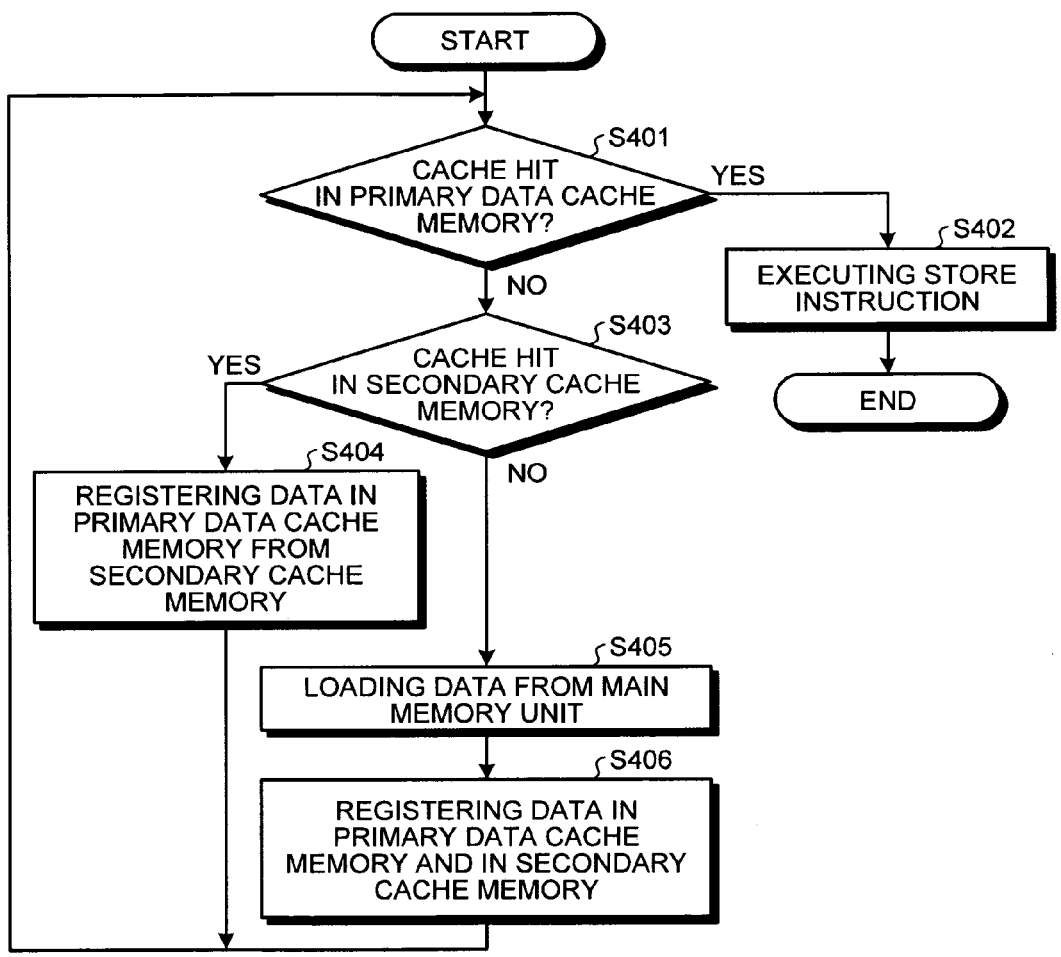
FIG. 7 is a flowchart illustrating the processing flow of a store instruction.

Referring to FIG. 7, a description will be given of the processing flow of the store instruction in step S106 illustrated in FIG. 4. FIG. 7 is a flowchart illustrating the processing flow of the store instruction.

As illustrated in FIG. 7, during execution of the store instruction, the storage unit 13 determines whether or not the data to be stored in the target store address has been cached in the primary data cache memory 15 (step S401). More specifically, the storage unit 13 determines whether or not the target store data has been stored in the primary data cache memory 15.

If there is a cache hit in the primary data cache memory 15 (yes in step S401), the storage unit 13 executes the store instruction that is processing to register the target store data in the cached address (step S402).

If there is no cache hit in the primary data cache memory 15 (no in step S401), the secondary cache and external access unit 16 determines whether or not the data to be stored in the target store address has been cached in the secondary cache memory 16a (step S403). More specifically, the secondary cache and external access unit 16 determines whether or not the target store data has been stored in the secondary cache memory 16a.

If there is a cache hit in the secondary cache memory 16a (yes in step S403), the secondary cache and external access unit 16 registers the data stored in the secondary cache memory 16a in the primary data cache memory 15 (step S404). Then the processor 10 returns to step S401 and executes subsequent processing.

If there is a cache miss in the secondary cache memory 16a (no in step S403), the secondary cache and external access unit 16 loads the data for the target store address from the main memory unit 20 (step S405). Then the secondary cache and external access unit 16 registers the data loaded from the main memory unit 20 in the target store address in the primary data cache memory 15 and in the target store address in the secondary cache memory 16a (step S406). The processor 10 then returns to step S401 and executes subsequent processing.

Specific Examples of Processing

Next, a description will be given of specific examples of the above-described processing, i.e., initialization of a predetermined area in the main memory unit 20 and copying data stored in one address in the main memory unit to another address therein.

Initialization of Main Memory Unit

First, a description will be given of an example of initializing a predetermined address in the main memory. In this example, the target initialization address is 0x1000. Before the store instruction for initialization is issued, the instruction control unit 11 issues the XFILL instruction on target store address 0x1000 to the storage unit 13. Next, the instruction control unit 11 issues, to the storage unit 13, the store instruction to request that data (all zero data) for initializing a predetermined area in the main memory unit 20 be stored.

The storage unit 13 then executes the XFILL instruction (address 1000) received from the instruction control unit 11 to request the secondary cache and external access unit 16 to execute the XFILL instruction. Then the secondary cache and external access unit 16 executes the XFILL instruction on address 0x1000. More specifically, if address 0x1000 has not been cached in the secondary cache memory 16a, the secondary cache and external access unit 16 registers all zero data in a data section 16c corresponding to address 0x1000. Then the secondary cache and external access unit 16 validates the flag of a tag memory section 16b having address 0x1000, i.e., validates the tag address of the tag memory section 16b having address 0x1000. If address 0x1000 has been cached in the secondary cache memory 16a, the secondary cache and external access unit 16 does not resister the all zero data and does not validate the tag.

During execution of the XFILL instruction, the storage unit 13 stores target address 1000 of the XFILL instruction in the XFILL address holding unit 13e of the address holding unit 13c. Then the storage unit 13 performs address matching for determining whether or not the address stored in the XFILL address holding unit 13e of the address holding unit 13c matches the target address of an instruction executed after the XFILL instruction is issued. If the instruction executed after the XFILL instruction is issued is an instruction on address 0x1000, i.e., a determination is made that the addresses match, the storage unit 13 inhibits the execution of the instruction subsequent to the XFILL instruction. Therefore, the storage unit 13 can inhibit the execution of the store instruction subsequent to the XFILL instruction, i.e., the store instruction to store the initialization data in the data section 16c corresponding to address 0x1000. The storage unit 13 inhibits the execution of the store instruction subsequent to the XFILL instruction until the XFILL instruction is completed.

Next, the secondary cache and external access unit 16 registers all zero data in the data section 16c corresponding to address 0x1000, validates the flag of the tag memory section 16b having address 0x1000, and then outputs an XFILL instruction completion notification to the storage unit 13. Upon receiving the XFILL instruction completion notification, the storage unit 13 invalidates the flag in the XFILL flag holding unit 13d of the address holding unit 13c. Then a determination is made that the address stored in the address holding unit 13c does not match the target address of the store instruction, and the storage unit 13 executes the store instruction subsequent to the XFILL instruction, i.e., the store instruction to store the initialization data in the data section 16c corresponding to address 0x1000.

More specifically, if address 0x1000 has been cached in the primary data cache memory 15, the storage unit 13 registers the initialization data in address 0x1000 in the primary data cache memory 15. If address 0x1000 has not been cached in the primary data cache memory 15, the storage unit 13 requests the secondary cache and external access unit 16 to execute the store instruction. Upon receiving the request, the secondary cache and external access unit 16 determines whether or not address 0x1000 has been cached in the secondary cache memory 16a. If there is a cache hit, the secondary cache and external access unit 16 registers the initialization data in the data section 16c corresponding to address 0x1000 in the secondary cache memory 16a. In this manner, the processor 10 can register the initialization data in the cache memories without accessing to the main memory unit 20.

Next, the secondary cache and external access unit 16 registers the initialization data registered in the data section 16c (address 0x1000) of the secondary cache memory 16a in address 0x1000 in the main memory unit 20 at the timing of the executing write-back processing to the main memory unit 20. Therefore, the secondary cache and external access unit 16 can register the initialization data in a predetermined address by accessing to the main memory unit 20 only once. When a predetermined area (for example, initialization starting address: 0x1000, ending address: 0x1010) is initialized, the XFILL instruction and the store instruction described above are performed on each of the above target addresses. In this manner, the addresses from 0x1000 to 0x1010 can be initialized.

Data Copy

Figure 8:
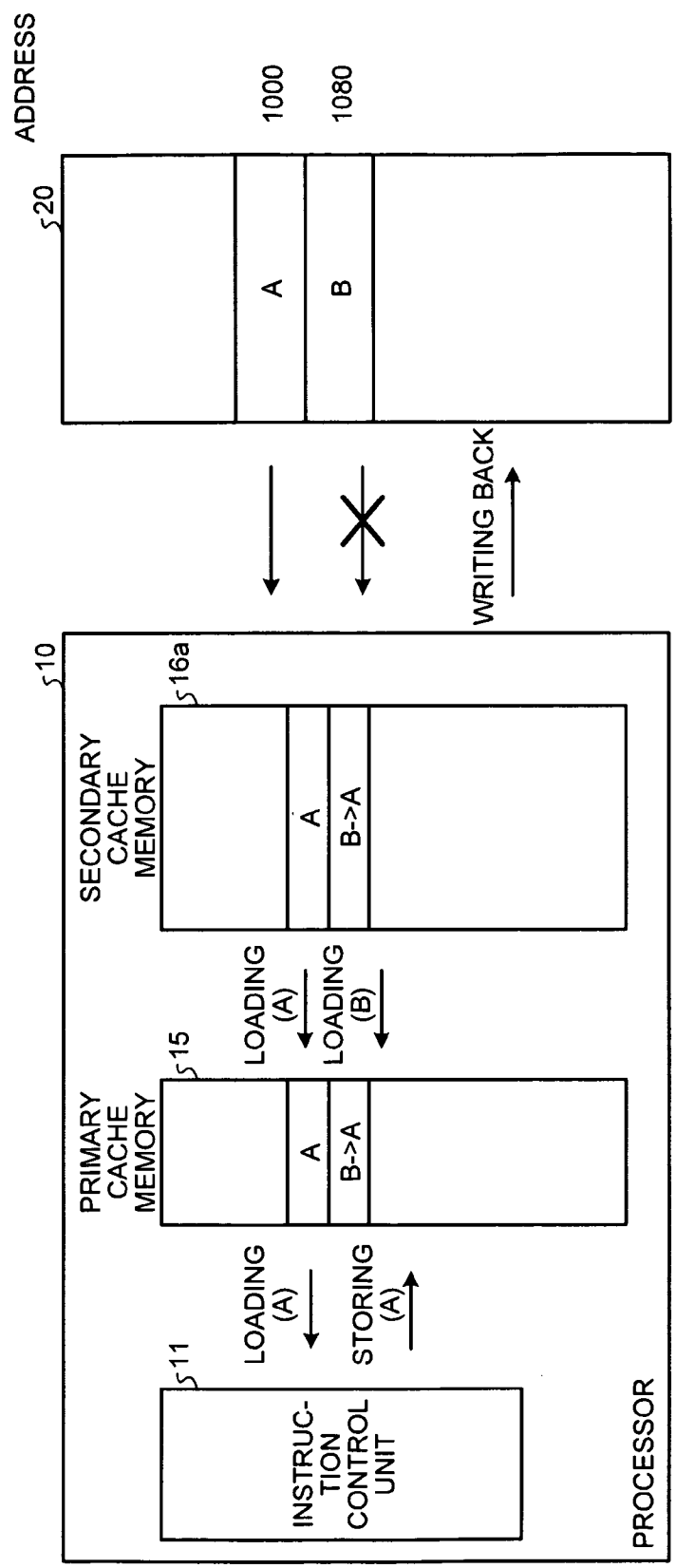
FIG. 8 is a diagram illustrating a process of copying data stored in one address in a main memory unit to another address therein by the processor according to the first embodiment.

Next, referring to FIG. 8, a description will be given of an example of copying data stored in one address in the main memory unit to another address therein. FIG. 8 is a diagram illustrating processing executed by the processor according to the first embodiment to copy data stored in one address in the main memory unit to another address therein. In the description, the copy source address is 0x1000, and the copy destination address is 0x1080.

To load the copy source data, the instruction control unit 11 issues a load instruction for address 0x1000. As illustrated in FIG. 8, the secondary cache and external access unit 16 loads copy source data A in address 0x1000 in the main memory unit 20 and registers the loaded data A in address 0x1000 in the primary data cache memory 15 and in address 0x1000 in the secondary cache memory 16a.

Then upon receiving a notification indicating completion of the loading processing for data A from the secondary cache and external access unit 16, the instruction control unit 11 issues the XFILL instruction on target store address 0x1080 to the storage unit 13 before the store instruction for the copying processing is issued. The instruction control unit 11 then issues the store instruction on the copy destination area in the main memory unit 20 to the storage unit 13.

The storage unit 13 executes the XFILL instruction (address 0x1080) received from the instruction control unit 11 and requests the secondary cache and external access unit 16 to execute the XFILL instruction. The secondary cache and external access unit 16 then executes the XFILL instruction on address 0x1080. More specifically, if address 0x1080 has not been cached in the secondary cache memory 16a, the secondary cache and external access unit 16 registers all zero data in a data section 16c corresponding to address 0x1008 and validates the flag of a tag memory section 16b having address 0x1008. If address 0x1080 has been cashed in the secondary cache memory 16a, the secondary cache and external access unit 16 does not register the all zero data and does not validate the tag.

During execution of the XFILL instruction, the storage unit 13 stores target address 0x1080 of the XFILL instruction in the XFILL address holding unit 13e of the address holding unit 13c. The storage unit 13 then performs address matching for determining whether or not the address stored in the XFILL address holding unit 13e matches the target address of an instruction executed after the XFILL instruction is issued. If the instruction executed after the XFILL instruction is issued is an instruction on address 0x1080, i.e., a determination is made that the addresses match, the storage unit 13 inhibits the execution of the instruction. Therefore, the storage unit 13 can inhibit the execution of the store instruction subsequent to the XFILL instruction, i.e., the store instruction to copy data A to the data section 16c corresponding to address 0x1080. The storage unit 13 inhibits the execution of the store instruction subsequent to the XFILL instruction until the XFILL instruction is completed.

Then the secondary cache and external access unit 16 registers all zero data in the data section 16c corresponding to address 0x1080, validates the flag of the tag memory section 16b having address 0x1080, and then outputs an XFILL instruction completion notification to the storage unit 13. Upon receiving the XFILL instruction completion notification, the storage unit 13 deletes address 0x1080 from the XFILL address holding unit 13e. Therefore, a determination is made that the address stored in the XFILL address holding unit 13e does not match the target address of the store instruction, and the storage unit 13 executes the store instruction subsequent to the XFILL instruction, i.e., the store instruction to copy data A to address 0x1080.

More specifically, the storage unit 13 determines whether or not address 0x1080 has been cached in the primary data cache memory 15. If there is a cache hit, the storage unit 13 resisters data A in address 0x1080 in the primary data cache memory 15. If address 0x1080 has not been cached in the primary data cache memory 15, the storage unit 13 requests the secondary cache and external access unit 16 to execute the store instruction. Upon receiving the request, the secondary cache and external access unit 16 determines whether or not address 0x1080 has been cached in the secondary cache memory 16a. If there is a cache hit, the secondary cache and external access unit 16 registers data A in a data section 16c corresponding to address 0x1080 in the secondary cache memory 16a. In this manner, the processor 10 can register data A in the cache memories without accessing to the main memory unit 20.

Next, the secondary cache and external access unit 16 registers data A registered in address 0x1080 in the secondary cache memory 16a in address 0x1080 in the main memory unit 20 at the timing of the executing write-back processing. Therefore, the secondary cache and external access unit 16 can register data A stored in copy source address 0x1000 in copy destination address 0x1080 without loading data B in copy destination address 0x1080.

Moreover, data can be copied to a plurality of areas, for example, data in copy source address 0x1000 can be copied to copy destination addresses 0x1010 to 0x1015. In such a case, the processor 10 first loads data from address 0x1000 as in the processing described above. Then the processor 10 executes the XFILL instruction and the store instruction described above on each of the copy destination addresses, whereby the source data can be copied.

Effects of First Embodiment

As described above, in the processor 10 according to the first embodiment, the main memory unit 20 can be initialized by accessing thereto only once (only at the time of the writing back). Moreover, in the processor 10, data can be copied within the main memory unit 20 by accessing thereto only twice (at the time of loading the copy source data and at the time of the writing back). Therefore, the processor 10 can initialize the main memory unit 20 and can copy data within the main memory unit 20 at faster processing speeds as compared to those when the block store instruction is used.

Effects of Instruction Order Control in First Embodiment

With the conventionally used block store instruction, the order of memory (memory ordering) may not be ensured, which is the rule of the order of data loaded or stored by the processor from or to a memory such as the primary cache memory, the secondary cache memory, or the main memory. For example, when data is block-stored in an area, the specification of the block store instruction does not guarantee which of the block-stored data or the data written by the store instruction finally remains in the area. When data is loaded from a block stored area, the program does not guarantee which of the data that is already present in the area before the block storing or the data written by the block storing is read.

Therefore, when the block store instruction is executed, the processor executes a membar (memory barrier) instruction for sequential memory accesses that is used as a technique for ensuring the execution results of the load or store instruction executed after the block store instruction. The processor executes the membar instruction after execution of the block store instruction. This ensures that an instruction to be executed after the block store instruction is executed after the execution of the block store instruction is completed.

However, the execution of the membar instruction results in sequentialization processing, and this may cause a reduction in the processing speed of the processor. In some cases, the membar instruction is not inadvertently inserted during development of a program. In such cases, the execution results of the load or store instruction is not guaranteed. Therefore, the operation is unstable since it seems that the sequentialization is achieved in some conditions or is not achieved in other conditions, and this causes bugs in the program.

However, the processor 10 according to the first embodiment can control the order of the XFILL instruction and the subsequent store instruction. In addition, in the processor 10, the sequentialization processing for order control by execution of the membar instruction to control the memory barrier is not performed. Therefore, unnecessary sequentialization processing is not performed, and the instability of the operation is eliminated, so that the cause of bugs in the program can be removed.

Figure 9:
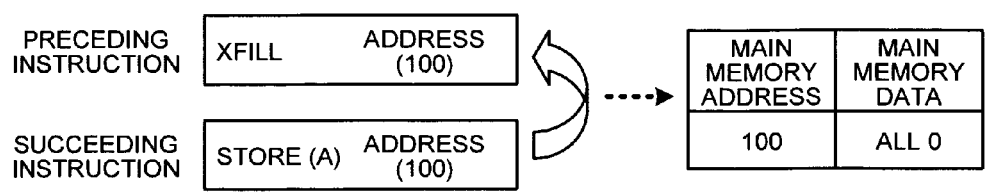
FIG. 9 is a diagram illustrating an exemplary case in which the store instruction is executed before completion of the XFILL instruction executed before the store instruction.
Figure 10:
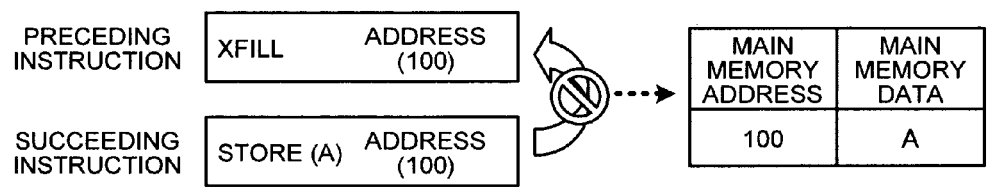
FIG. 10 is a diagram illustrating an exemplary case in which the store instruction is executed after completion of the XFILL instruction executed before the store instruction.

For example, in the processor 10 according to the first embodiment, the execution of the store instruction subsequent to the XFILL instruction can be inhibited by holding the target address of the XFILL instruction in the address holding unit 13c to perform address matching. Referring to FIGS. 9 and 10, a description will be given of examples in which data A is stored in an area in which all zeros are registered by the XFILL instruction. FIG. 9 is a diagram illustrating an example in which the subsequent store instruction is executed before completion of the preceding XFILL instruction. FIG. 10 is a diagram illustrating an example in which the subsequent store instruction is executed after completion of the preceding XFILL instruction.

In the case illustrated in FIG. 9 in which the subsequent store instruction is executed before completion of the preceding XFILL instruction, the store instruction (data A) is swept into the main memory unit 20 while the execution of the XFILL instruction is inhibited, and the flag of a tag memory section 16b in the secondary cache memory 16a is invalidated. In this case, the store instruction (data A) is executed before the XFILL instruction. Therefore, as illustrated in FIG. 9, data A that has been registered is overwritten with all zero data in the XFILL instruction, and data A that to be finally registered may not be registered.

However, when the subsequent store instruction is executed after completion of the preceding XFILL instruction as illustrated in FIG. 10, the store instruction (data A) is never executed before the XFILL instruction. Therefore, as illustrated in FIG. 10, the all zero data that has been registered by the XFILL instruction is overwritten with data A, and data A that to be finally registered can be registered.

As described above, the processor 10 according to the first embodiment can control the order of the XFILL instruction and the subsequent store instruction. Moreover, in the processor 10, since the sequentialization processing for order control by execution the membar instruction to control the memory barrier is not performed, unnecessary sequentialization processing is not performed. In addition, since unnecessary sequentialization processing is not performed, higher-speed memory control can be achieved.

If an area in the main memory unit 20 that is a target area of the XFILL instruction has been registered in the secondary cache memory 16a, the processor 10 according to the first embodiment completes the processing without executing zero clear (registration of zero data) on the secondary cache memory 16a. In addition, the processor 10 does not validate the flag of a tag memory section 16b in the secondary cache memory 16a. In other words, the processor 10 completes the processing without executing any processing.

More specifically, if the area has been registered in the secondary cache memory 16a, there is a possibility that the processing target data in the main memory unit 20 has also been registered in the primary data cache memory 15. Therefore, before the target processing area is subjected to zero clear on the secondary cache memory 16a, the processor 10 searches the primary data cache memory 15 to determine whether or not the data has been registered therein. If the data has been registered in the primary data cache memory 15, the processor 10 invalidates the cache line in the primary data cache memory 15 and examines whether or not the entire primary data cache memory 15 is invalidated. The processor 10 execute zero clear on the secondary cache memory 16a after the above examination.

To complete the processing, the processor 10 may also control the zero clear processing on the secondary cache memory 16a and the invalidation examination processing executed for the primary data cache memory 15 such that they are not executed in the wrong order. Otherwise, data inconsistencies can occur between the primary data cache memory 15 and the secondary cache memory 16a. To correctly implement such a design, a considerable verification process is performed, and there is a risk of bugs after shipment.

To avoid such a risk, the processor 10 according to the first embodiment is controlled such that the zero clear processing on the secondary cache memory 16a is not executed when there is a cache hit.

Therefore, with the processor 10 according to the first embodiment, the invalidation of the primary data cache memory 15 and the processing for monitoring the processing execution order are not performed for the target processing area in the main memory unit 20, and the control of the secondary cache memory 16a can be simplified. Even when the zero clear processing is not performed on the secondary cache memory 16a, the occurrence of a cache hit means that a referenceable area is referenced since the cached area is under the control of the memory management unit of the secondary cache memory 16a. To ensure completion of the preceding load or store instruction that accesses the same data area as the target area of the XFILL instruction, the processing for the XFILL instruction is executed after completion of the preceding load or store instruction.

Effective Use of Register

In the block store instruction, 64-byte data, for example, is prepared in a resister of the execution unit 12 such as an arithmetic unit and is used as the store data. If the block store instruction is simply extended, the instruction handles, for example, 128-byte or 256-byte data. In such a case, as the cache line is extended, the amount of data prepared in the register of the arithmetic unit increases. Since the entire data for one block store instruction may be prepared in the register, depletion of the register file for supplying data to the execution unit 12 can easily occur. Moreover, since alignment for redefining the data width processed by an instruction may be performed each time the cache line size is changed, the block store instructions based on different cache sizes of the processor in the computation device may be prepared.

In the processor 10 according to the first embodiment, high-speed control of the memories can be achieved without using the block store instruction. Therefore, the register area is not used for the block store instruction, and the register can thereby be efficiently used. In addition, in the processor 10 according to the first embodiment, the data width processed by an instruction is not redefined each time the cache line size is changed. Therefore, the design time for the processor and other units can be significantly reduced.

One embodiment of the cache memory control unit disclosed in the present application has been described. However, in addition to the above-described embodiment, the present invention can be embodied in various forms. Therefore, other embodiments will be described below.

Hierarchy of Cache Memories

In the description of the first embodiment above, two primary cache memories and one secondary cache memory are used. However, the number of cache memories is not limited thereto. In the first embodiment, the two-level cache memory is exemplified, but this does not limit the number of levels. For example, a three-level cache memory including a primary cache memory, a secondary cache memory, and a third-level cache memory can be used in the cache memory control unit disclosed in the present application, when the third-level cache memory is used as the target for the XFILL instruction. More specifically, the processing described in the first embodiment can be performed on any number of levels of cache memories when a cache memory closest to the main memory unit is used as the target for the XFILL instruction.

Data Registered by XFILL Instruction

In the first embodiment above, an example of registering all zeros by the XFILL instruction has been described, but this is not a limitation. For example, since all target store data in the main memory unit 20 is replaced with store data, any data may be used so long as there is no error.

Suitable Processor

The cache memory control unit disclosed in the present application may include a plurality of processor cores and a plurality of primary cache memories in the processor. However, the cache memory control unit applied to, for example, a system having a single processor can achieve higher-speed processing than the cache memory control unit applied to a system, such as an SMP (Symmetrical Multi-Processing) system, having a plurality of processors. In a system having a plurality of processors, before a cache line is registered, invalidation of the cache line may be requested to other processors, and invalidation completion notifications may be received. Since a system having a single processor includes no other processors, such processing can be omitted, and therefore the memories can be controlled at higher speed.

Application to Prefetch Mechanism

Many recent processors include a hardware prefetch mechanism. The function performed by the hardware prefetch mechanism is to monitor the effective address of the load-store instruction to prefetch, from the main memory unit 20, an area on which the load-store instruction is possibly executed in the future. When the cache memory control unit disclosed in the present application is used, the store instruction is executed while the execution of the hardware prefetch is inhibited. Therefore, registration of a target store area in the secondary cache memory by the hardware prefetch before the XFILL instruction is avoided. In this manner, the cache memory control unit disclosed in the present application is applicable to a processor having the hardware prefetch mechanism.

Structure of Server

Figure 11:
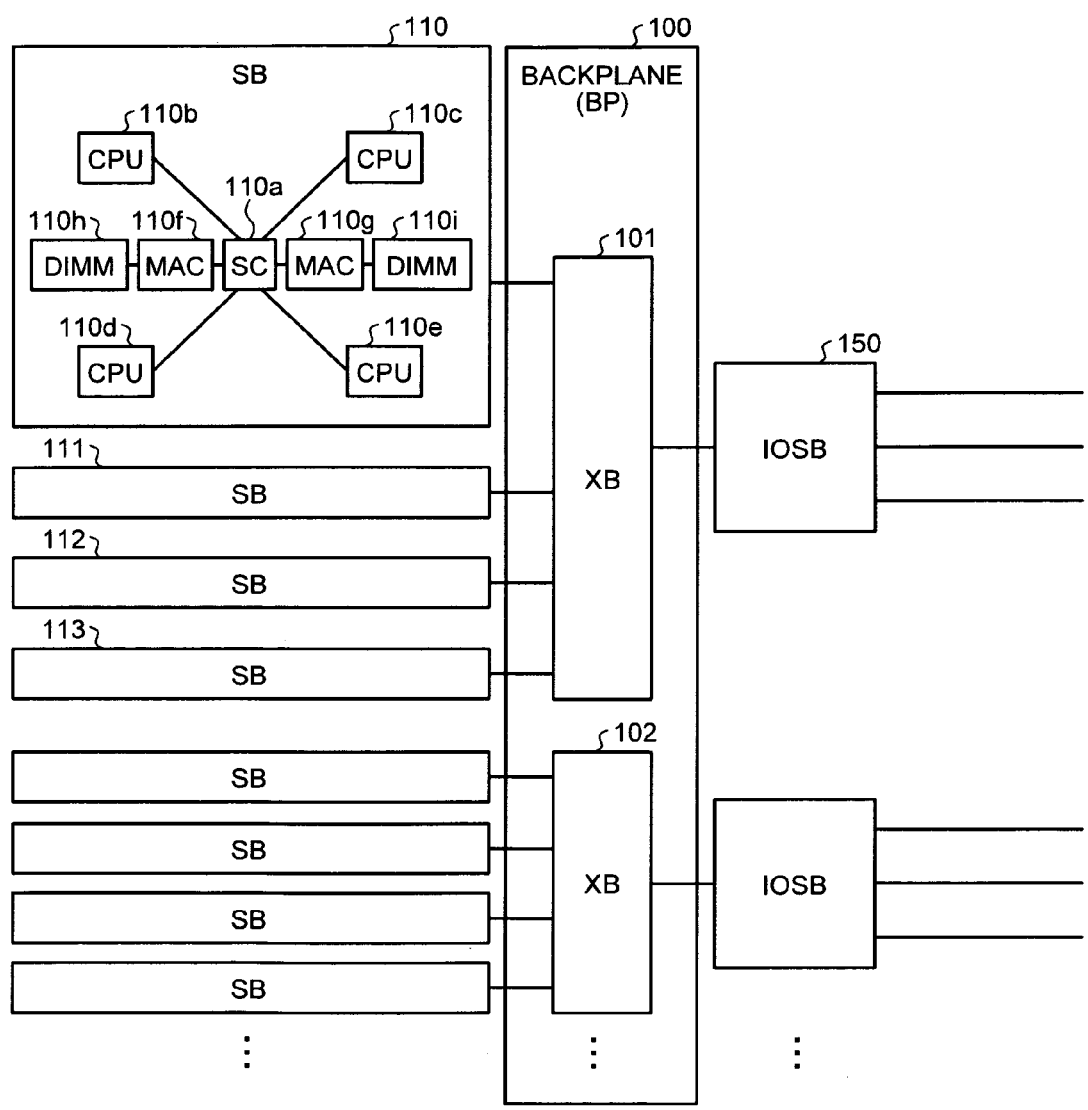
FIG. 11 is a diagram illustrating the structure of a server.
Figure 12:
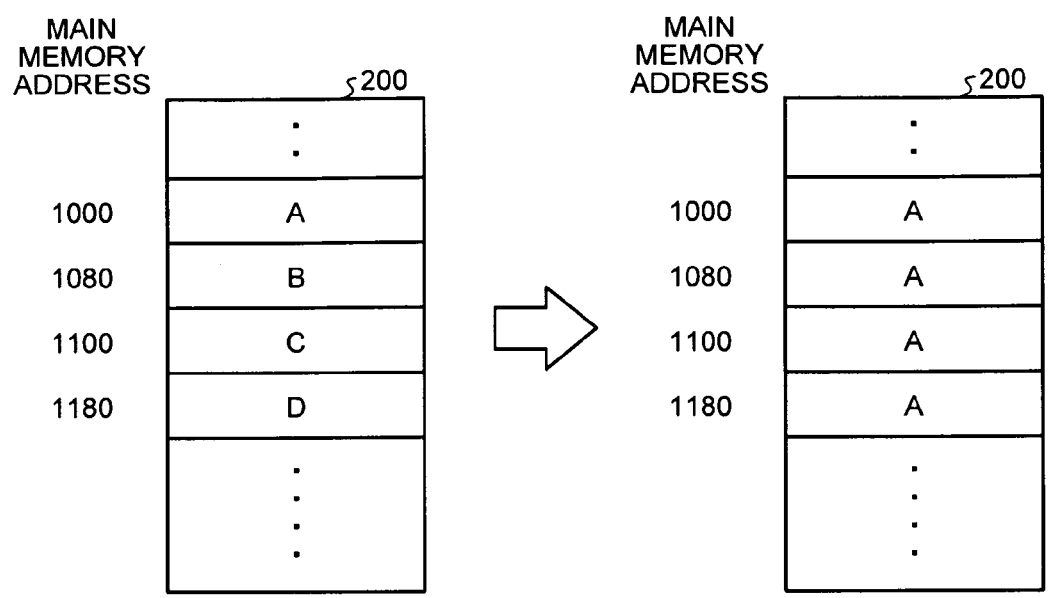
FIG. 12 is a diagram illustrating an exemplary case in which data in one address in the main memory unit is copied to another address therein.
Figure 13:
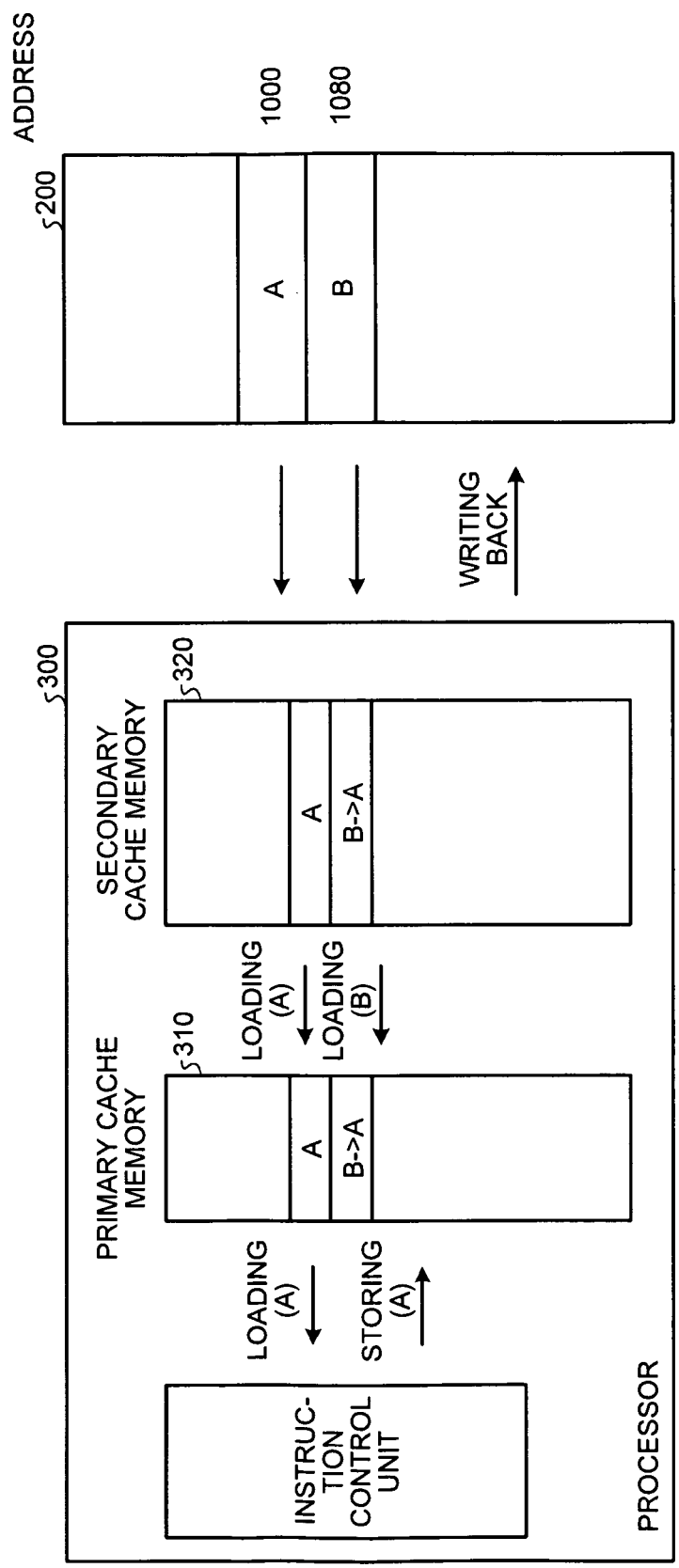
FIG. 13 is a diagram illustrating an exemplary case in which data in one address in a conventional main memory unit is copied to another address therein.

The structure of a server having the processor disclosed in the above embodiment installed therein is illustrated in FIG. 11. FIG. 11 is a diagram illustrating the structure of the server. As illustrated in FIG. 11, the server includes a plurality of crossbar switches (XB101, XB102, etc) disposed in a backplane 100 and further includes system boards SB 110 to SB 113 and an input-output system board (IOSB) 150 that are provided for each crossbar switch. The numbers of the crossbar switches, the system boards, and the input-output system boards are for the purpose of illustration only, and the numbers are not limited thereto.

The backplane 100 is a circuit board that forms a bus for mutually connecting a plurality of connectors and the like. The XB 101 and XB 102 are switches for dynamically selecting the paths for data exchanged between the system boards and the input-output system boards.

The SB 110, The SB 111, The SB 112, The and SB 113 connected to the XB 101 and XB 102 are electronic circuit boards constituting electronic devices and have the same structure. Therefore, only the SB 110 will be described. The SB 110 includes a system controller (SC), four CPUs, memory access controllers (MACs), and DIMMs (Dual Inline Memory Modules).

The SC 110*a* controls processing such as data transfer between the CPUs 110*b* to 110*e* and the MACs 110*f* and 110*g* mounted on the SB 110 to control the entire SB 110. The CPUs 110*b* to 110*e* are connected to other electronic devices through the SC and are processors that embody the cache memory control method disclosed in the above embodiment. The MAC 110*f* is connected between the DIMM 110*h* and the SC and controls access to the DIMM 110*h*. The MAC 110*g* is connected between the DIMM 110*i* and the SC and controls access to the DIMM 110*i*. The DIMM 110*h* is connected to other electronic devices through the SC and is a memory module to which an additional memory is attached. The DIMM 110*i* is connected to other electronic devices through the SC and is a memory module to which an additional memory is attached.

The IOSB 150 is connected to the SB 110 to SB 113 through the XB 101 and is also connected to input-output devices through a SCSI (Small Computer System Interface), an FC (Fibre Channel), an Ethernet (registered trademark), etc. The IOSB 150 controls processing such as data transfer between the input-output devices and the XB 101. The electronic devices such as the CPUs, MACs, and DIMMs mounted on the SB 110 are for the purpose of illustration only, and the types and the numbers of the electronic devices are not limited to those illustrated in the figure.

According to embodiments of the arithmetic processing unit, the information processing device, and the cache memory control method disclosed in the present application, the main memory unit can be initialized at fast speed, and data stored in one address in the main memory unit can be copied to another address therein at fast speed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention has been described in detail, it should be understood that the various changes, substitutions, and alterations could be made hereto without departing from the spirit and scope of the invention.

What is claimed is:

1. An arithmetic processing unit connected to a main memory, comprising:
   a cache memory comprising hardware and having a plurality of cache lines in which part of data held in the main memory is held, the cache memory being a store-in cache;
   a tag memory comprising hardware and that holds, in the plurality of cache lines, a tag address used to search for the data held in the plurality of cache lines and a flag indicating validity of the data held in the plurality of cache lines;
   an instruction control unit that issues a cache line fill instruction before (i) issuing a store instruction for initializing a predetermined area in the main memory or (ii) issuing a store instruction for copying data in a predetermined area in the main memory to another area in the main memory;
   an instruction execution unit that executes the cache line fill instruction on a cache line corresponding to a specified address corresponding to the predetermined area of the main memory and that executes a store instruction on the specified address;
   a cache memory control unit that,
   (a) when the instruction execution unit executes the cache line fill instruction and the specified address is not cached in the cache memory, registers all zero data in a cache line of the cache memory which has a tag address corresponding to the specified address and validates a flag in the cache line having the tag address corresponding to the specified address,
   (b) when the instruction execution unit executes the cache line fill instruction and the specified address is cached in the cache memory, does not register all zero data nor validate the flag;

(c) holds the specified address until registration of the all zero data in the cache line having the tag address corresponding to the specified address and validation of the flag in the cache line having the tag address corresponding to the specified address are completed;

(d) inhibits execution of a memory access instruction on the specified address executed by the instruction execution unit while the specified address is held, and (e) releases inhibition of the execution of the memory access instruction on the specified address executed by the instruction execution unit after the completion of the registration of the all zero data and the validation of the flag, wherein the instruction execution unit executes the store instruction after the cache memory control unit releases the inhibition of the execution of the memory access instruction on the specified address.

2. The arithmetic processing unit according to claim 1, further comprising:

a second cache memory that holds part of the data held in the cache memory; and a data registration unit that registers data in the second cache memory, wherein, after the cache memory control unit completes the registration of the all zero data in the cache line having the tag address corresponding to the specified address and the validation of the flag in the cache line having the tag address corresponding to the specified address, the data registration unit registers the all zero data in the second cache memory, and wherein the instruction execution unit executes the store instruction on the specified address after the all zero data is registered in the second cache memory.

3. An information processing device, comprising a main memory and an arithmetic processing unit connected to the main memory, wherein the arithmetic processing unit comprising;

a cache memory comprising hardware and having a plurality of cache lines in which part of data held in the main memory is held, the cache memory being a store-in cache;

a tag memory comprising hardware and that holds, in the plurality of cache lines, a tag address used to search for the data held in the plurality of cache lines and a flag indicating validity of the data held in the plurality of cache lines;

an instruction control unit that issues a cache line fill instruction before (i) issuing a store instruction for initializing a predetermined area in the main memory or (ii) issuing a store instruction for copying data in a predetermined area in the main memory to another area in the main memory;

an instruction execution unit that executes the cache line fill instruction on a cache line corresponding to a specified address corresponding to the predetermined area of the main memory and that executes a store instruction on the specified address;

a cache memory control unit that, (a) when the instruction execution unit executes the cache line fill instruction and the specified address is not cached in the cache memory, registers all zero data in a cache line of the cache memory which has a tag address corresponding to the specified address and validates a flag in the cache line having the tag address corresponding to the specified address, (b) when the instruction execution unit executes the cache line fill instruction and the specified address is cached in the cache memory, does not register all zero data nor validate the flag;

(c) holds the specified address until registration of the all zero data in the cache line having the tag address corresponding to the specified address and validation of the flag in the cache line having the tag address corresponding to the specified address are completed;

(d) inhibits execution of a memory access instruction on the specified address executed by the instruction execution unit while the specified address is held, and (e) releases inhibition of the execution of the memory access instruction on the specified address executed by the instruction execution unit after the completion of the registration of the all zero data and the validation of the flag, wherein the instruction execution unit executes the store instruction after the cache memory control unit releases the inhibition of the execution of the memory access instruction on the specified address.

4. The information processing device according to claim 3, further comprising:

a second cache memory that holds part of the data held in the cache memory; and a data registration unit that registers data in the second cache memory, wherein, after the cache memory control unit completes the registration of the all zero data in the cache line having the tag address corresponding to the specified address and the validation of the flag in the cache line having the tag address corresponding to the specified address, the data registration unit registers the all zero data in the second cache memory, and wherein the instruction execution unit executes the store instruction on the specified address after the all zero data is registered in the second cache memory.

5. A cache memory control method for an arithmetic processing unit, the arithmetic processing unit including a cache memory having a plurality of cache lines in which part of data held in a main memory is held, the cache memory being a store-in cache, and a tag memory that holds, in the plurality of cache lines, a tag address used to search for the data held in the plurality of cache lines and a flag indicating validity of the data held in the plurality of cache lines, the method comprising;

issuing, by an instruction control unit that the arithmetic processing unit includes, a cache line fill instruction before (i) issuing a store instruction for initializing a predetermined area in the main memory or (ii) issuing a store instruction for copying data in a predetermined area in the main memory to another area in the main memory;

executing, by an instruction execution unit that the arithmetic processing unit includes, the cache line fill instruction on a cache line corresponding to a specified address corresponding to the predetermined area of the main memory and executing a store instruction on the specified address, when the instruction execution unit executes the cache line fill instruction and the specified address is not cached in the cache memory, registering, by a cache memory control unit that the arithmetic processing unit includes, all zero data in a cache line of the cache memory which has a tag address corresponding to the specified address and validating, by a cache memory control unit that the arithmetic processing unit includes, a flag in the cache line having the tag address corresponding to the specified address, when the instruction execution unit executes the cache line fill instruction and the specified address is cached in the cache memory, not registering, by the cache memory control unit, all zero data nor validating, by the cache memory control unit, the flag;

holding the specified address until registration of the all zero data in the cache line having the tag address corresponding to the specified address and validation of the flag in the cache line having the tag address corresponding to the specified address are completed;

inhibiting execution of a memory access instruction on the specified address executed by the instruction execution unit while the specified address is held, and releasing inhibition of the execution of the memory access instruction on the specified address executed by the instruction execution unit after the completion of the registration of the all zero data and the validation of the flag, wherein the instruction execution unit executes the store instruction after the release of the inhibition of the execution of the memory access instruction on the specified address.

6. The cache memory control method according to claim 5, wherein the arithmetic processing unit further includes:

a second cache memory that holds part of the data held in the cache memory; and a data registration unit that registers data in the second cache memory, and wherein the cache memory control method further comprises:

after the cache memory control unit completes the registration of the all zero data in the cache line having the tag address corresponding to the specified address and the validation of the flag in the cache line having the tag address corresponding to the specified address, registering, by the data registration unit, the all zero data in the second cache memory; and executing, by the instruction execution unit, the store instruction on the specified address after the all zero data is registered in the second cache memory.

* * * * *